(12) United States Patent
Melby et al.

(10) Patent No.: US 9,506,414 B2
(45) Date of Patent: Nov. 29, 2016

(54) COLD START EMISSIONS REDUCTION DIAGNOSTIC SYSTEM FOR AN INTERNAL COMBUSTION ENGINE

(71) Applicant: GM Global Technology Operations LLC, Detroit, MI (US)

(72) Inventors: Steve L. Melby, Howell, MI (US); Kevin J. McKay, New Hudson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 524 days.

(21) Appl. No.: 14/043,274

(22) Filed: Oct. 1, 2013

(65) Prior Publication Data

US 2015/0094933 A1    Apr. 2, 2015

(51) Int. Cl.
   *F02D 28/00*   (2006.01)
   *F02D 41/06*   (2006.01)
   *F02D 41/14*   (2006.01)
   *F02D 41/40*   (2006.01)

(52) U.S. Cl.
   CPC ......... *F02D 41/064* (2013.01); *F02D 41/1462* (2013.01); *F02D 41/401* (2013.01); *F02D 2041/1413* (2013.01); *F02D 2041/1433* (2013.01); *F02D 2041/1437* (2013.01); *F02D 2200/021* (2013.01); *Y02T 10/44* (2013.01)

(58) Field of Classification Search
   CPC ........... F02D 41/064; F02D 2200/021; F02D 41/1461; F02D 41/1462
   USPC ........................................................ 701/103
   See application file for complete search history.

(56) References Cited

U.S. PATENT DOCUMENTS

| | | | | |
|---|---|---|---|---|
| 6,273,056 B1* | 8/2001 | Shirakawa | ............... | F02D 21/08 123/305 |
| 6,360,531 B1* | 3/2002 | Wiemero | .................. | F01L 1/34 123/299 |
| 6,931,840 B2* | 8/2005 | Strayer | ................. | F02D 41/062 123/406.47 |
| 2003/0212484 A1* | 11/2003 | Takebayashi | ......... | F01N 3/2013 701/114 |
| 2004/0000136 A1* | 1/2004 | Miura | ................... | F01N 3/2006 60/284 |
| 2004/0168430 A1* | 9/2004 | Mazur | ................... | F01N 3/0814 60/277 |
| 2009/0118974 A1* | 5/2009 | Okada | ................... | F02D 35/027 701/103 |
| 2014/0041367 A1* | 2/2014 | Balthes | ................... | F01N 3/035 60/274 |

* cited by examiner

*Primary Examiner* — Hieu T Vo
*Assistant Examiner* — Arnold Castro
(74) *Attorney, Agent, or Firm* — Cantor Colburn LLP

(57) ABSTRACT

A cold start emissions reduction diagnostic system for an internal combustion engine includes a coolant temperature module including a coolant temperature input, and a memory module having a coolant temperature look-up table. The cold start controller also includes a cold start emissions reduction module configured to selectively compare coolant temperature values with desired emission values in the look-up table to determine at least one of a fuel injection timing and a fuel injection quantity to establish a desired cold start emissions profile. A fuel injection monitoring module is configured and disposed to sense changes in fuel injection timing and fuel injection quantity, and an emission reduction diagnostic model module is configured and disposed to determine emission parameters based on the changes in the one of the fuel injection timing and fuel injection quantity sensed by the fuel injection monitoring module during a cold start.

11 Claims, 3 Drawing Sheets

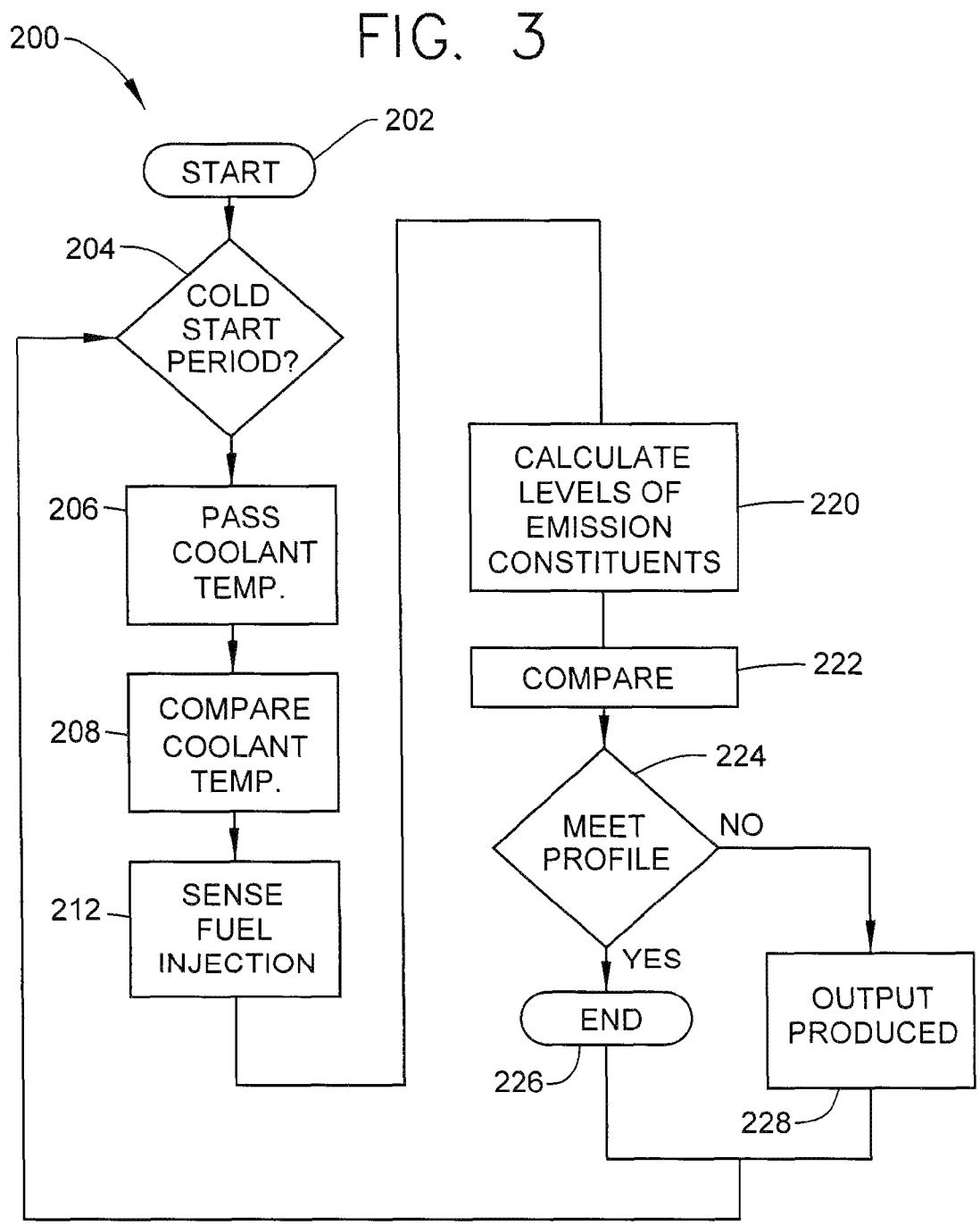

COLD START EMISSIONS REDUCTION DIAGNOSTIC SYSTEM FOR AN INTERNAL COMBUSTION ENGINE

FIELD OF THE INVENTION

The subject invention relates to the art of internal combustion engines and, more particularly, to a cold start emissions reduction diagnostic system for an internal combustion engine.

BACKGROUND

Internal combustion engines include various controllers that establish operating parameters targeted to lower emissions. Fuel injection timing, fuel injection quantity, engine timing, and the like, are controlled such that emissions from the motor vehicle remain within desired targeted limits. During normal operating temperatures, exhaust gases passing from the motor vehicle are monitored for oxides of nitrogen ("NOx") levels. Fuel injection timing and/or fuel injection quantity may be adjusted to maintain NOx levels within the desired target limits in the emissions. Unfortunately, NOx monitoring is not possible until NOx sensors come to operating temperature. Therefore, current control systems may not maintain emissions within desired target ranges during a cold start period or a period during which the internal combustion engine is below normal operating temperatures. Accordingly, it is desirable to provide a controller with logic that can adjust fuel injection timing and/or fuel injection quantity during cold start periods, and/or operation below normal operating conditions to achieve desired emissions parameters.

SUMMARY OF THE INVENTION

In accordance with an exemplary embodiment, a cold start emissions reduction diagnostic system for an internal combustion engine includes a coolant temperature module including a coolant temperature input, and a memory module having coolant temperature look-up table. The controller also includes a cold start emissions reduction module configured to selectively compare coolant temperature values with desired emission values in the look-up table to determine at least one of a fuel injection timing and a fuel injection quantity to establish a desired cold start emissions profile. A fuel injection monitoring module is configured and disposed to sense changes in fuel injection timing and fuel injection quantity, and an emission reduction model module is configured and disposed to determine emission parameters based on the changes in the one of the fuel injection timing and fuel injection quantity sensed by the fuel injection monitoring module during a cold start.

In accordance with another exemplary embodiment, an internal combustion engine system includes an engine block, one or more fuel injectors an air inlet, and an exhaust outlet. A cooling system is fluidically connected to the engine block. The cooling system includes a coolant temperature sensor. An exhaust system is fluidically connected to the exhaust outlet. A cold start emissions reduction diagnostic system is operatively connected to the one or more fuel injectors. The cold start controller includes a coolant temperature module having a coolant temperature input operatively connected to the coolant temperature sensor, a memory module including a look-up table, and a cold start emissions reduction module configured to selectively compare coolant temperature values with desired emission values in the look-up table to determine at least one of a fuel injection timing and a fuel injection quantity to establish a desired cold start emissions profile for the internal combustion engine. A fuel injection monitoring module is configured and disposed to sense changes in fuel injection timing and fuel injection quantity, and an emission reduction model module is configured and disposed to determine emission parameters based on the changes in the one of the fuel injection timing and fuel injection quantity sensed by the fuel injection monitoring module during a cold start.

In yet another exemplary embodiment of the invention, a method of diagnosing emissions controls during cold starts includes detecting coolant temperature, comparing coolant temperature with values stored in a look-up table, correlating coolant temperature, fuel injection timing, fuel injection quantity and desired emissions parameters, setting at least one of a fuel injection timing and a fuel injection quantity to achieve a desired cold start emissions profile for the internal combustion engine, sensing a change in the one of the fuel injection timing and fuel injection timing, passing the change in the one of the fuel injection timing and fuel injection quantity to an emissions reduction model module, and determining at least one emissions parameter in the exhaust gases during the cold start The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flow diagram illustrating a method of diagnosing emissions controls during a cold start of an internal combustion engine, in accordance with an exemplary embodiment.

DESCRIPTION OF THE EMBODIMENTS

Figure 1:
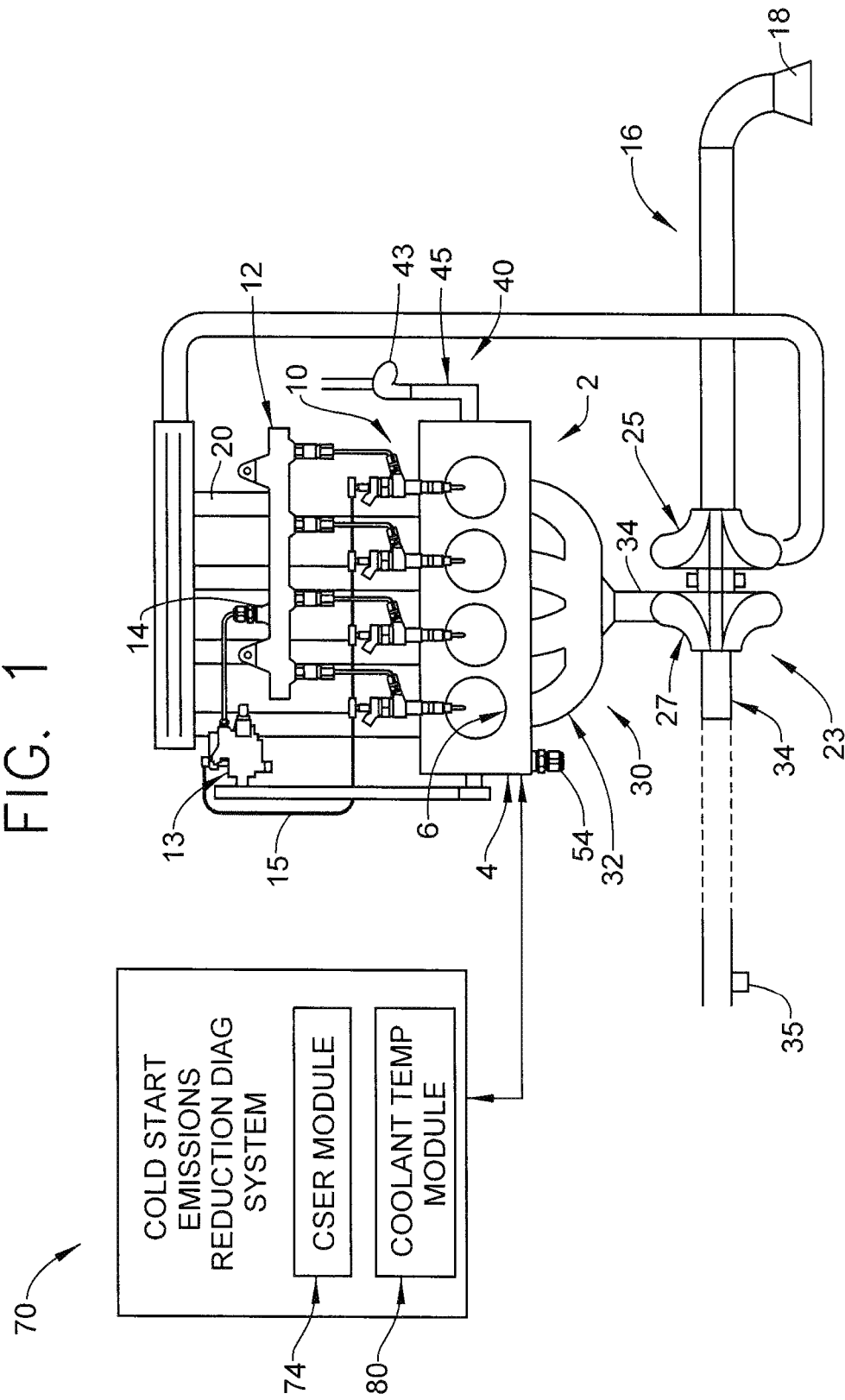
FIG. 1 is a schematic view of an internal combustion engine including a cold start emissions diagnostic system, in accordance with an exemplary embodiment.

The following description is merely exemplary in nature and is not intended to limit the present disclosure, its application or uses. It should be understood that throughout the drawings, corresponding reference numerals indicate like or corresponding parts and features. An internal combustion engine is indicated generally at 2, in FIG. 1. Internal combustion engine 2 is shown in the form of diesel engine having an engine block 4 provided with a number of piston cylinders, one of which is indicated at 6. Of course, it should be understood that internal combustion engine 2 may take on a variety of forms. Engine block 4 also includes an engine head (not shown) that is mounted across cylinders 6. Internal combustion engine 2 also includes a plurality of fuel injectors, one of which is indicated at 10, that may be supported in the cylinder head. Fuel injectors 10 are fluidically connected to a fuel injection manifold 12. Fuel injection manifold 12 includes a fuel injection controller 13 that delivers fuel to fuel injectors 10 through a fuel inlet 14. Fuel injection controller 13 also controls fuel injection timing and fuel injection quantity through a control lead 15.

Internal combustion engine 2 also includes an air intake system 16 fluidically connected to engine block 4. Air intake system 16 includes an air inlet 18 that delivers air to a plurality of discharge conduits 20 fluidically connected to engine block 4 (typically to the engine head). Air intake system 16 also includes a turbocharger 23 having a compressor portion 25 and a turbine portion 27. Compressor portion 25 is fluidically connected between air inlet 18 and discharge conduits 20. Turbine portion 27 is fluidically connected to an exhaust system 30. Exhaust gases pass through exhaust system 30 driving turbine portion 27. Turbine portion 27 drives compressor portion 25 to compress inlet air passing through air intake system 16. Exhaust system 30 includes an exhaust manifold 32 fluidically connected to engine block 4, typically through the cylinder head, and an exhaust outlet 34 that delivers exhaust gases to one or more emissions reduction devices (not shown). Exhaust outlet 34 includes a NOx sensor 35 that senses NOx levels in exhaust gases passing from exhaust outlet 34 downstream of the one or more emissions reduction devices.

Internal combustion engine 2 is also shown to include a cooling system 40 having a water pump 43 that delivers coolant, typically water combined with one or more other fluids, through a conduit 45 into cooling jackets (not shown) formed in engine block 4 and the cylinder head. Cooling system 40 includes a coolant temperature sensor 54 that senses a temperature of coolant in internal combustion engine 2.

In accordance with an exemplary embodiment, internal combustion engine 2 includes a cold start emissions reduction diagnostic system 70. Cold start emissions reduction diagnostic system 70 establishes cold start parameters for internal combustion engine 2 to achieve desired emissions parameters, as will be discussed more fully below. At this point it should be understood that the term "cold start" describes an operating condition of internal combustion engine 2 that exists before the coolant reaches a thermostat regulating temperature. More specifically, cold start describes a period of operation that exists before a thermostatic valve (not shown) in cooling system 40 opens in response to the coolant achieving a predetermined temperature.

Figure 2:
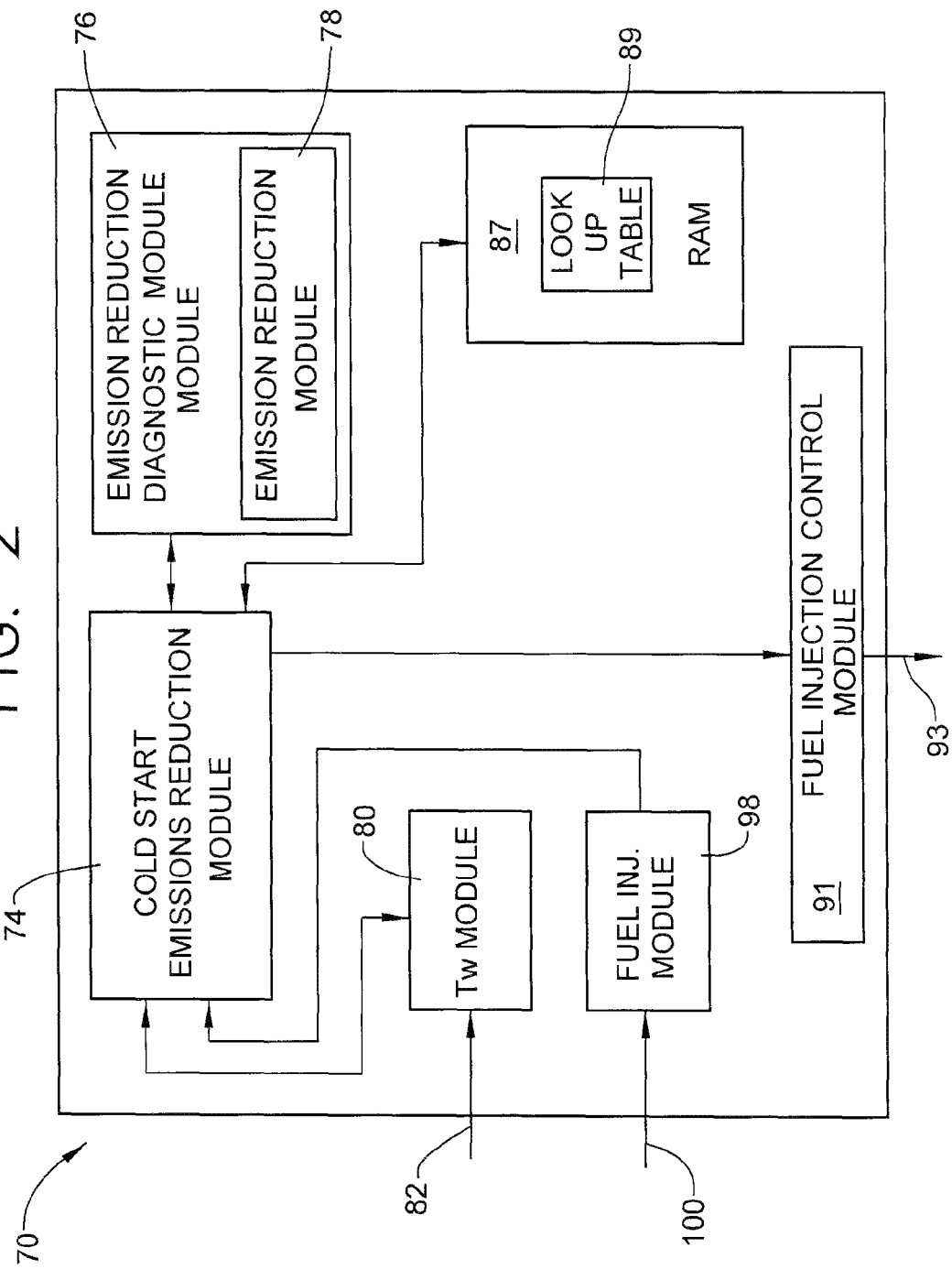
FIG. 2 is a data flow diagram illustrating the cold start emissions diagnostic system of FIG. 1.

FIG. 2 is an illustration of a dataflow diagram that illustrates various elements that may be embedded within the cold start emissions reduction diagnostic system 70. Various embodiments of cold start emissions reduction diagnostic system 70 of FIG. 1, according to the present disclosure, may include any number of sub-modules that may be combined or further partitioned as well. Cold start emissions reduction diagnostic system 70 includes a cold start emissions reduction module 74 that includes various algorithms that, when implemented, reduce exhaust emissions from internal combustion engine 2 during cold start periods. Cold start emissions reduction diagnostic system 70 also includes an emissions reduction diagnostic model module 76 that verifies that emissions during cold start are within desired parameters.

Emissions reduction diagnostic model module 76 includes an emissions reduction model 78 that determines emission parameters based on input from fuel injection controller 13. As will be detailed more fully below, emissions reduction diagnostic model module 76 compares emissions parameters calculated based on fuel injection timing and/or fuel injection quantity values with a desired emissions profile of internal combustion engine 2 to verify emissions compliance. Emissions reduction diagnostic model module 76 is operatively connected to cold start emissions reduction module 74. Cold start emissions reduction diagnostic system 70 also includes a coolant temperature module 80 having a coolant temperature input 82 operatively connected to coolant temperature sensor 54 (FIG. 1). Coolant temperature module 80 is also operatively connected to cold start emissions reduction module 74.

As further shown in FIG. 2, cold start emissions reduction diagnostic system 70 includes a memory module 87, having stored therein a coolant temperature look-up table 89. Coolant temperature look-up table 89 generally defines a calibrated table or NOx model that correlates coolant temperature, fuel injection timing, fuel injection quantity with desired emission parameters, for example NOx output, for a particular internal combustion engine. Of course it should be understood that coolant temperature look-up table 89 may also use other factors to establish desired emission parameters including ambient conditions, intake air flow, turbocharger boost pressure and the like.

Cold start emissions reduction module 74 is also operatively connected to a fuel injection control module 91 having a fuel injection control output 93. Fuel injection control output 93 is operatively connected to fuel injection controller 13 (FIG. 1). As will become more fully evident below, fuel injection control module 91 sets a desired fuel injection timing and fuel injection quantity during cold start periods. A fuel injection monitoring module 98 is also connected to cold start emissions reduction module 74. Fuel injection monitoring module 98 includes a fuel injection feedback input 100 operatively coupled to fuel injection controller 13. Fuel injection feedback input 100 delivers sensed fuel injection timing and/or fuel injection quantity values to emissions reduction diagnostic model module 76. As will be detailed more fully below, cold start emissions reduction diagnostic system 70 selectively controls fuel injection timing and fuel injection quantity to achieve a desired emissions profile during cold start periods. The desired emissions parameters may be derived from coolant temperature look-up table 89. Emissions reduction diagnostic model module 76 verifies that actual changes in fuel injection timing and/or fuel injection quantity meet the desired emissions profile.

Reference will now follow to FIG. 3 in describing a method 200 of controlling a cold start of an internal combustion engine 2, in accordance with an exemplary embodiment. Method 200 begins in block 202 and a determination is made in block 204 whether internal combustion engine 2 is in a cold start period. A cold start period, as discussed above, represents an operational mode that occurs prior to the coolant reaching thermostat control temperature. In block 206, coolant temperature, as sensed by coolant temperature sensor 54, is passed to cold start emissions reduction module 74. In block 208, the coolant temperature is compared with coolant temperature values in coolant temperature look-up table 89 to determine a desired fuel injection timing and/or fuel injection quantity to achieve a desired emissions profile. In block 212, fuel injection monitoring module 98 senses actual fuel injection timing and quantity. The actual fuel injection timing and/or quantity values are passed to emissions reduction diagnostic model module 76.

In block 220, using emissions reduction model 78, emissions reduction diagnostic model module 76 calculates levels of one or more emissions constituents, such as NOx levels, based on the actual fuel injection timing and/or fuel injection quantity values. The calculated levels of the one or more emissions constituents are compared with values representing a desired emissions profile to confirm emissions levels are in compliance, in block 222. If the calculated levels of the one or more emissions constituents meet the desired emissions profile, e.g., the calculated levels of the one or more emissions constituents values are at or near the desired emissions profile as determined in block 224, method 200 ends in block 226. If however, calculated levels of the one or more emissions constituents values are outside of desired levels, as determined in block 224 an output is produced in block 228 indicating that emissions are outside of desired parameters during a cold start. Method 200 continues as coolant temperatures increase to thermostat regulating temperature. Once the coolant has reached thermostat regulating temperate, internal combustion engine is no longer in a cold start condition and method 200 ends. With this arrangement, emissions reduction diagnostic model modules 76 verifies that emissions control elements are operating as desired to verify emissions compliance during cold start periods.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A cold start emission reduction diagnostic system for an internal combustion engine comprising:
    a coolant temperature module including a coolant temperature input;
    a memory module including a coolant temperature look-up table;
    a cold start emissions reduction module configured to selectively compare coolant temperature values with desired emission values in the look-up table to determine at least one of a fuel injection timing and a fuel injection quantity to establish a desired cold start emissions profile;
    a fuel injection monitoring module configured and disposed to sense changes in fuel injection timing and fuel injection quantity; and
    an emission reduction diagnostic model module configured and disposed to determine emission parameters based on the changes in the one of the fuel injection timing and fuel injection quantity sensed by the fuel injection monitoring module during a cold start, wherein the emission reduction diagnostic model module includes a NOx model that determines an amount of NOx entrained in exhaust gases during the cold start.

2. The cold start emission reduction diagnostic system according to claim 1, wherein the coolant temperature look-up table comprises a calibrated table that correlates coolant temperature, fuel injection timing, and fuel injection quantity with NOx output.

3. The cold start emission reduction diagnostic system according to claim 1, wherein the emission reduction diagnostic model module compares emission parameters to a threshold value to determine whether exhaust gas emissions are within desired parameters.

4. An internal combustion engine comprising:
    an engine block, one or more fuel injectors, an air inlet, and an exhaust outlet;
    a cooling system fluidically connected to the engine block, the cooling system including a coolant temperature sensor;
    an exhaust system fluidically connected to the exhaust outlet; and
    a cold start emissions reduction diagnostic system operatively connected to the one or more fuel injectors, the cold start controller comprising:
        a coolant temperature module including a coolant temperature input operatively connected to the coolant temperature sensor;
        a memory module including coolant temperature look-up table;
        a cold start emissions reduction module configured to selectively adjust fuel injection timing and fuel injection quantity to establish a desired emissions profile of exhaust gases passing from the exhaust system;
        a fuel injection monitoring module configured and disposed to sense changes in fuel injection timing and fuel injection quantity; and
        an emission reduction diagnostic model module configured and disposed to determine emission parameters based on the changes in the one of the fuel injection timing and fuel injection quantity sensed by the fuel injection monitoring module during a cold start, wherein the emission reduction diagnostic model module includes a NOx model that determines an amount of NOx entrained in exhaust gases during the cold start.

5. The internal combustion engine according to claim 4, wherein the coolant temperature look-up table comprises a calibrated table that correlates coolant temperature, fuel injection timing, and fuel injection quantity with NOx output.

6. The internal combustion engine according to claim 4, wherein the emission reduction diagnostic model module compares emission parameters to a threshold value to determine whether exhaust gas emissions meet the desired emissions profile during cold start.

7. The internal combustion engine according to claim 4, wherein the internal combustion engine is a diesel engine.

8. A method of diagnosing emissions controls during a cold start of an internal combustion engine, the method comprising:
    detecting coolant temperature;
    comparing coolant temperature with values in a look-up table that correlates coolant temperature, fuel injection timing, fuel injection quantity and desired emissions parameters;
    setting at least one of a fuel injection timing and a fuel injection quantity to achieve a desired emissions profile for exhaust gases passing from the internal combustion engine during a cold start;
    sensing a change in the one of the fuel injection timing and fuel injection quantity;
    passing the change in the one of the fuel injection timing and fuel injection quantity to an emissions reduction model module; and
    determining at least one emissions parameter in the exhaust gases during the cold start including determining NOx levels in the exhaust gases based on a NOx model in the emissions reduction model module and comparing the exhaust gas NOx levels with the desired emissions profile during the cold start.

9. The method of claim 8, further comprising:
comparing the at least one emissions parameter with a threshold value to determine whether exhaust gas emissions meet the desired emissions profile during the cold start.

10. The method of claim 8, further comprising: calibrating the look-up table based on the change in the at least one of the fuel injection timing and fuel injection quantity.

11. The method of claim 8, wherein setting the at least one of the fuel injection timing and the fuel injection quantity includes setting both fuel injection timing and fuel injection quantity to achieve the desired emissions profile.

\* \* \* \* \*